United States Patent [19]

Andersson

[11] Patent Number: 5,545,247
[45] Date of Patent: Aug. 13, 1996

[54] PARTICULATE $CAF_2$ AND $BAF_2$ AGENT FOR IMPROVING THE MACHINABILITY OF SINTERED IRON-BASED POWDER

[75] Inventor: Owe Andersson, Viken, Sweden

[73] Assignee: Höganäs AB, Höganäs, Sweden

[21] Appl. No.: 338,595

[22] PCT Filed: May 27, 1993

[86] PCT No.: PCT/SE93/00469

§ 371 Date: Nov. 23, 1994

§ 102(e) Date: Nov. 23, 1994

[87] PCT Pub. No.: WO93/24261

PCT Pub. Date: Dec. 9, 1993

[30] Foreign Application Priority Data

May 27, 1992 [SE] Sweden .................... 9201678

[51] Int. Cl.⁶ .................... C22C 33/02; C22C 38/22
[52] U.S. Cl. .................... 75/231; 75/246; 75/255
[58] Field of Search .................... 75/231, 230, 255, 75/252, 253, 246, 255; 252/24

[56] References Cited

U.S. PATENT DOCUMENTS

| | | | |
|---|---|---|---|
| 3,297,571 | 1/1967 | Bonis | 252/12 |
| 3,419,363 | 12/1968 | Sliney | 29/182.1 |
| 4,214,905 | 7/1980 | Sliney | 75/200 |
| 4,256,489 | 3/1981 | Van Wyk | 75/173 R |
| 4,274,876 | 6/1981 | Kodama et al. | 75/243 |
| 4,345,943 | 8/1982 | Takahashi et al. | 75/238 |
| 4,348,232 | 9/1982 | Hiraoka et al. | 75/238 |
| 4,546,737 | 10/1985 | Kazuoka et al. | 128/188 S |
| 4,671,491 | 6/1987 | Kuroishi et al. | 251/368 |
| 4,724,000 | 2/1988 | Larson et al. | 75/236 |
| 4,836,848 | 6/1989 | Mayama et al. | 75/231 |
| 4,915,735 | 4/1990 | Motooka | 75/231 |
| 4,970,049 | 11/1990 | Baker et al. | 419/11 |
| 5,007,956 | 4/1991 | Fujita et al. | 75/238 |
| 5,125,811 | 6/1992 | Amano et al. | 418/179 |
| 5,273,570 | 12/1993 | Sato et al. | 75/231 |
| 5,326,526 | 7/1994 | Ikenoue et al. | 419/38 |
| 5,332,422 | 7/1994 | Rao | 75/252 |
| 5,346,529 | 9/1994 | Pettersson | 75/252 |
| 5,434,210 | 7/1995 | Rangaswamy et al. | 524/406 |

FOREIGN PATENT DOCUMENTS

| | | |
|---|---|---|
| 0277239 | 8/1988 | European Pat. Off. |
| 53-123314 | 10/1978 | Japan. |
| 62-164850 | 1/1988 | Japan .............. C22C 38/22 |
| 63-42348 | 7/1988 | Japan .............. C22C 33/02 |
| 63-137137 | 9/1988 | Japan. |
| 885319 | 11/1981 | U.S.S.R. |
| 1114704A | 9/1984 | U.S.S.R. |
| 1481262A | 5/1989 | U.S.S.R. |

*Primary Examiner*—Charles T. Jordan
*Assistant Examiner*—Daniel Jenkins
*Attorney, Agent, or Firm*—Burns, Doane, Swecker & Mathis, L.L.P.

[57] ABSTRACT

The invention relates to an additive for improving the machinability of iron-based powder compositions. The additive contains a combination of calcium fluoride particles and barium fluoride particles, which is included in an amount of 0.1–1.0% by weight in the powder composition. Further, the invention relates to powder compositions containing the indicated additives, as well as sintered products produced from the powder compositions.

6 Claims, 8 Drawing Sheets

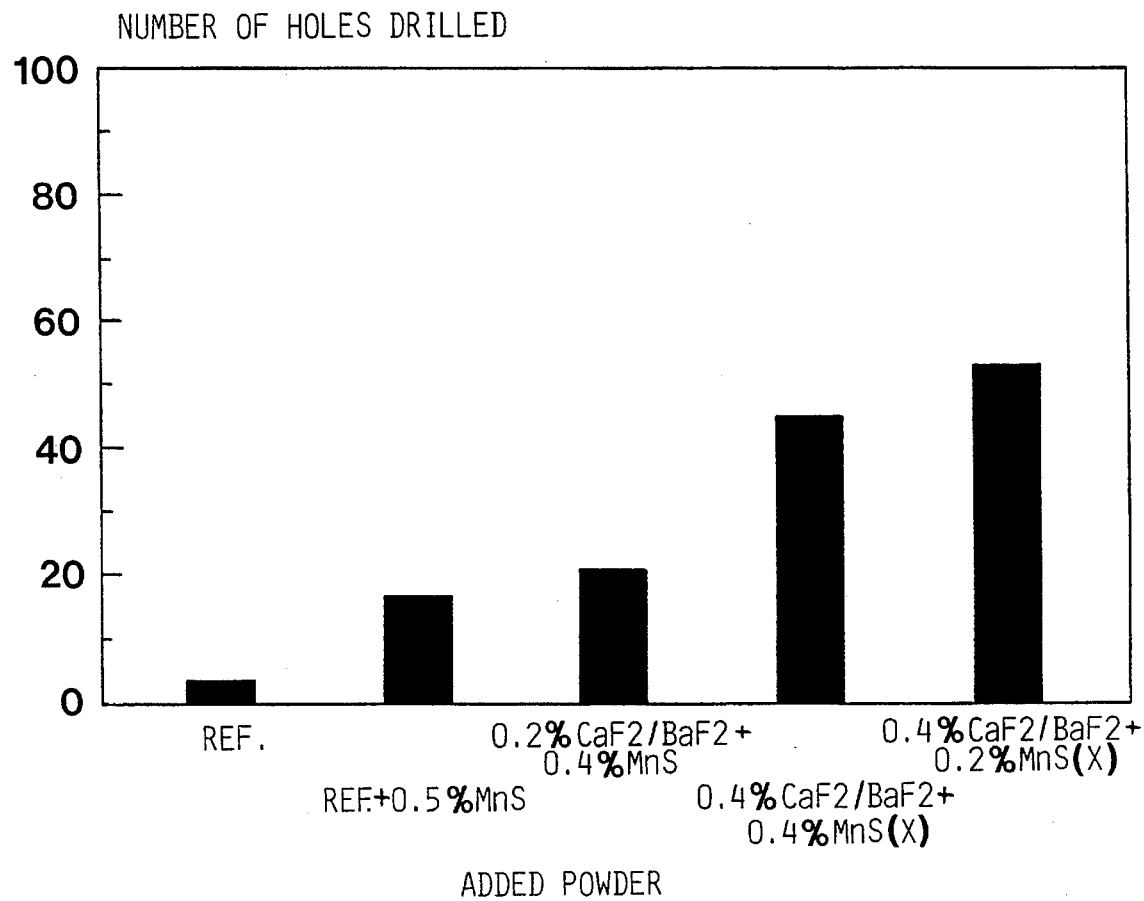

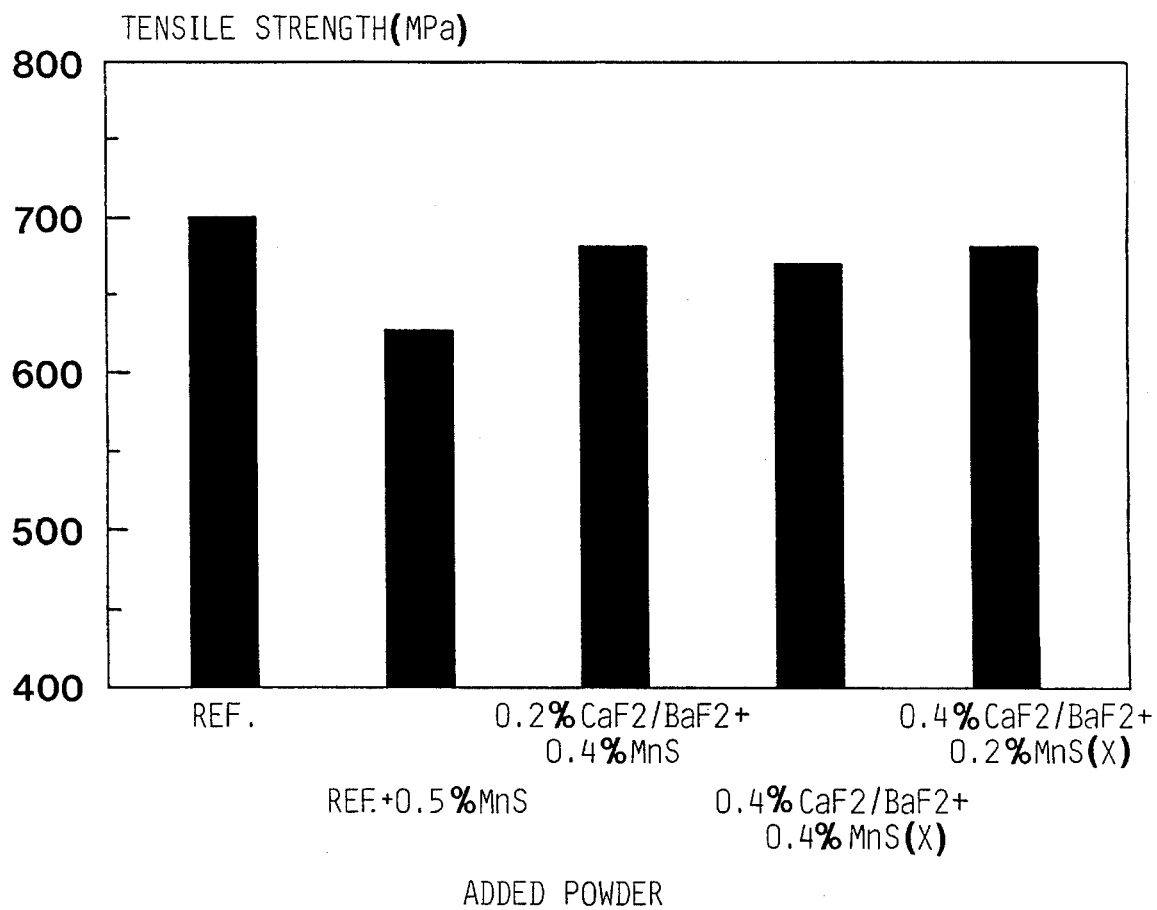

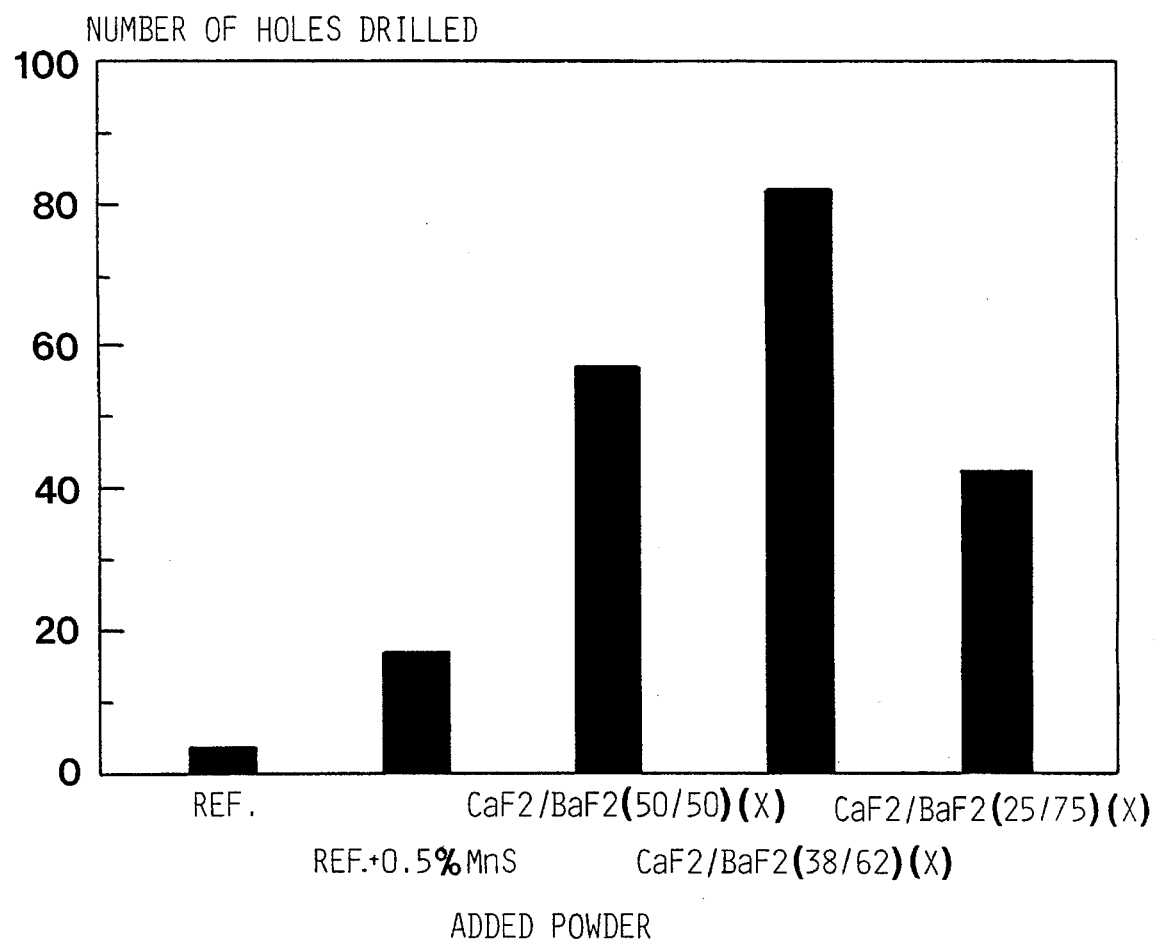
FIG.2a: MACHINABILITY OF Fe-4%Ni-1.5%Cu-0.5%Mo-0.5%C WITH ADDITION OF 0.6%CaF2/BaF2(VARYING WEIGHT RATIO)+0.2%MnS
COMPACTING: 600MPa
SINTERING: 1120C; 30 MIN; ENDOGAS+C-POT=0.5%
(X): INVENTIVE POWDER

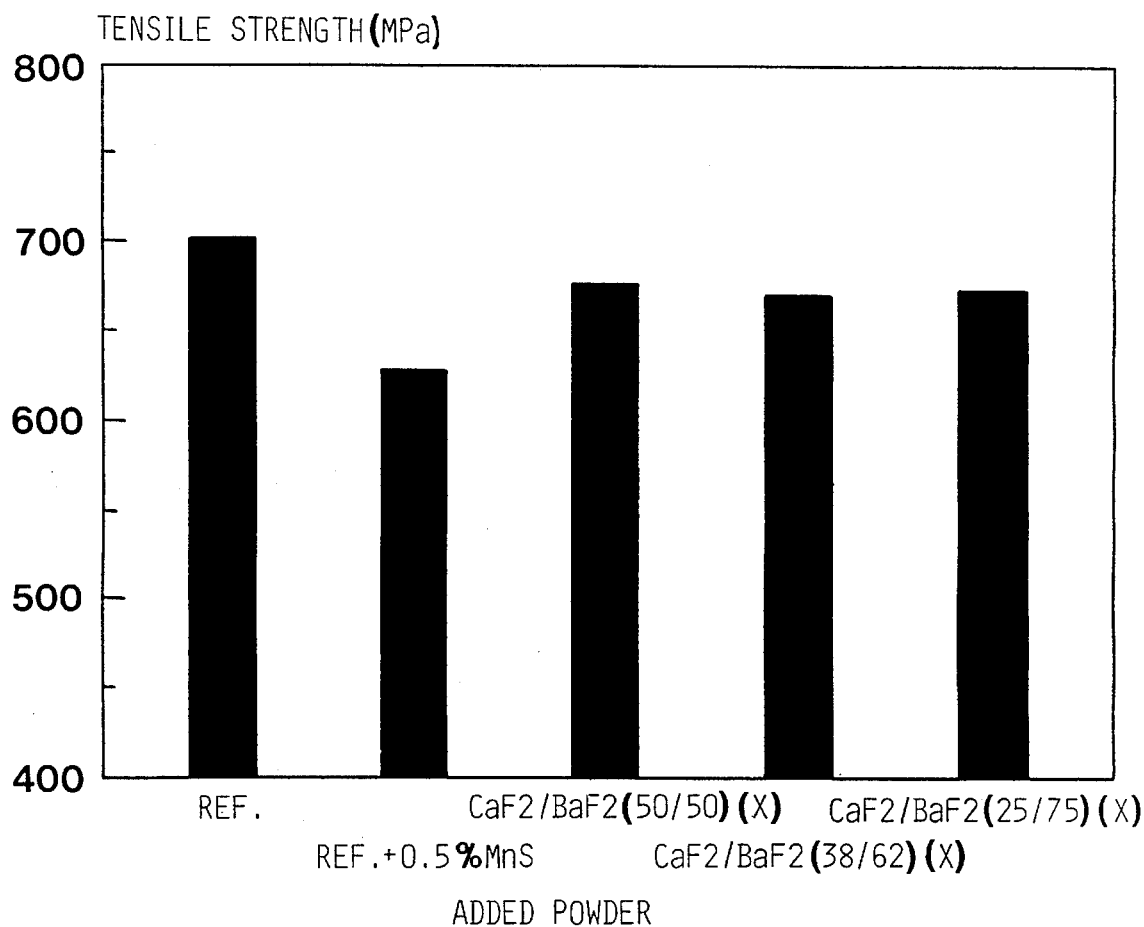

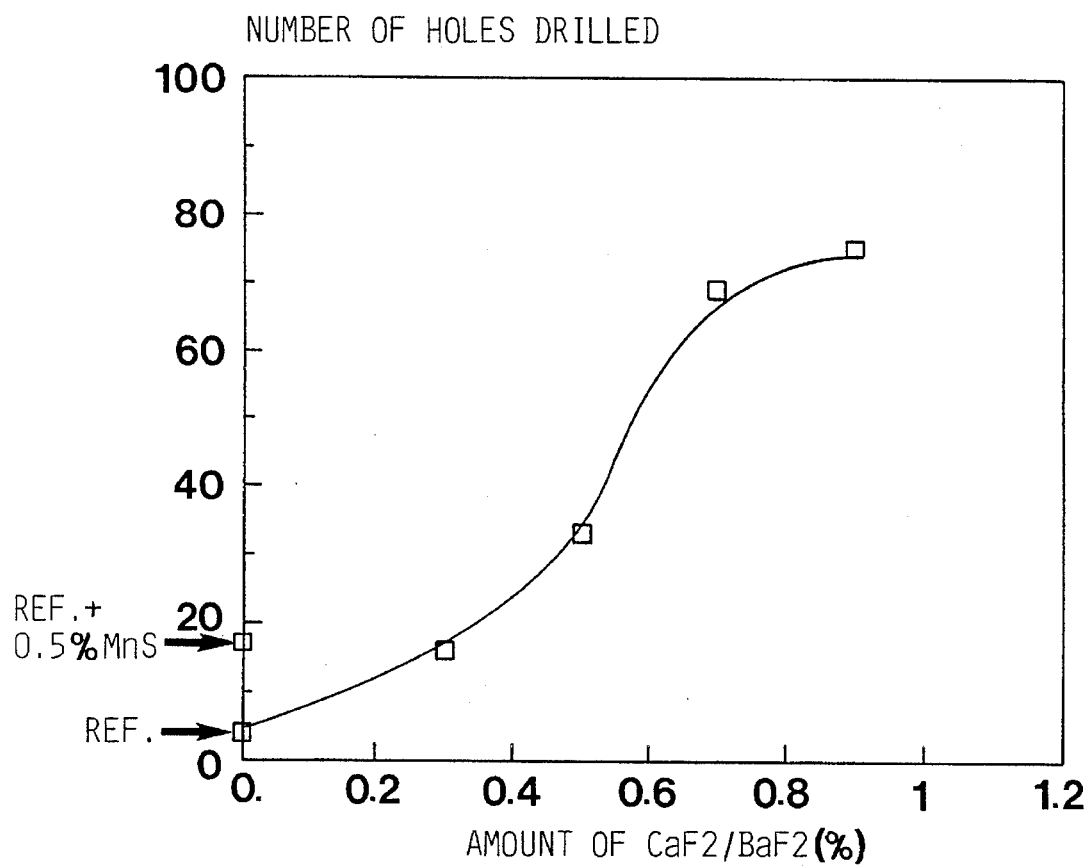

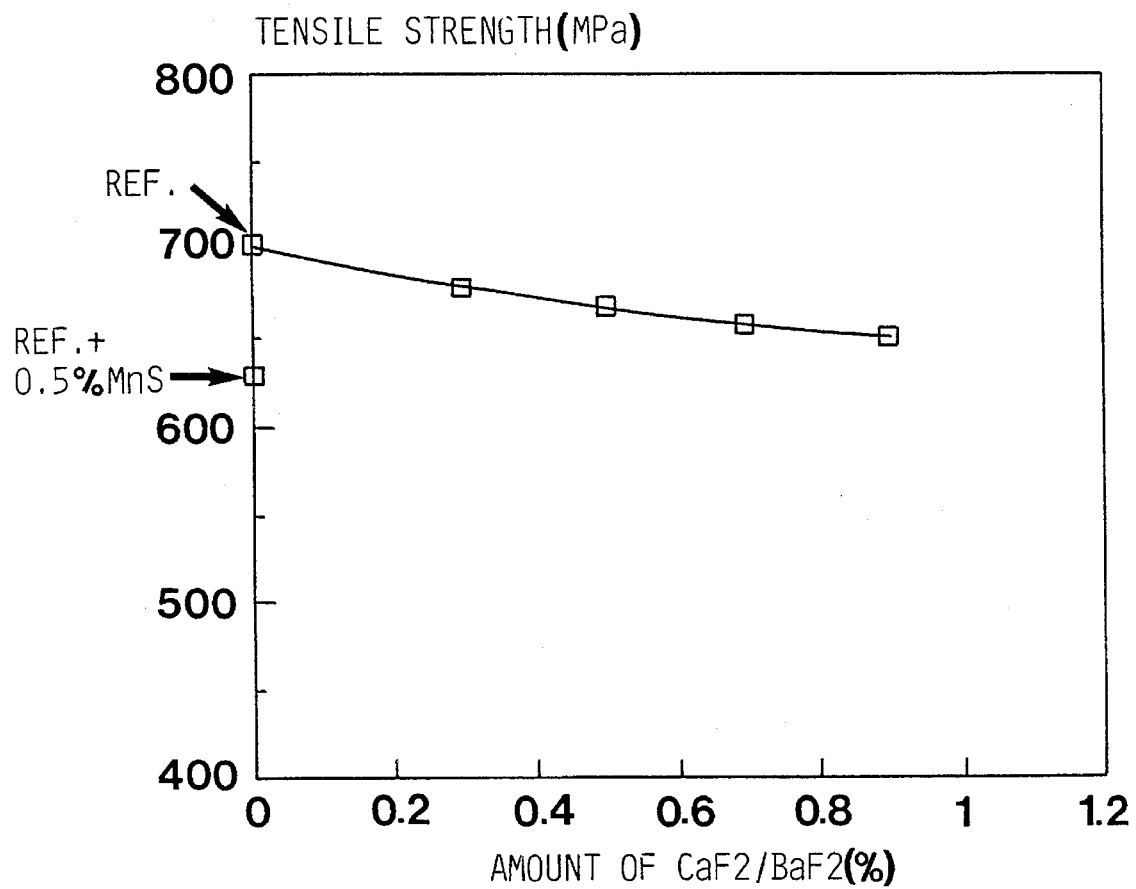

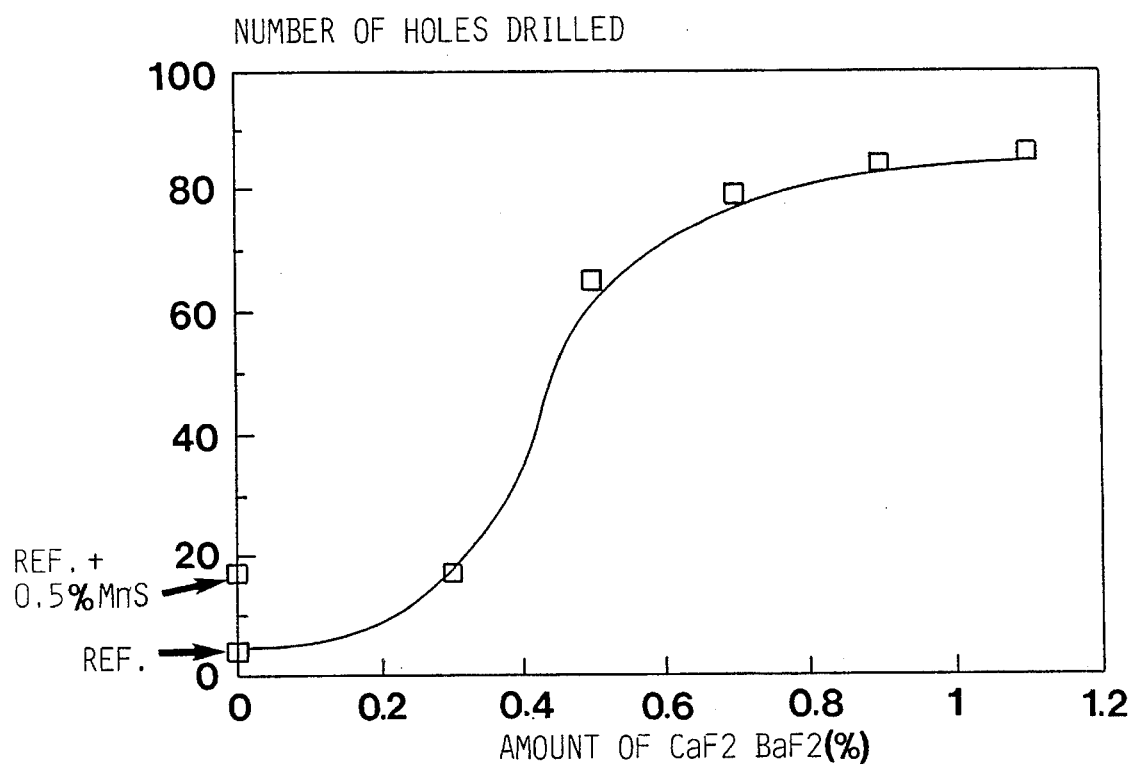

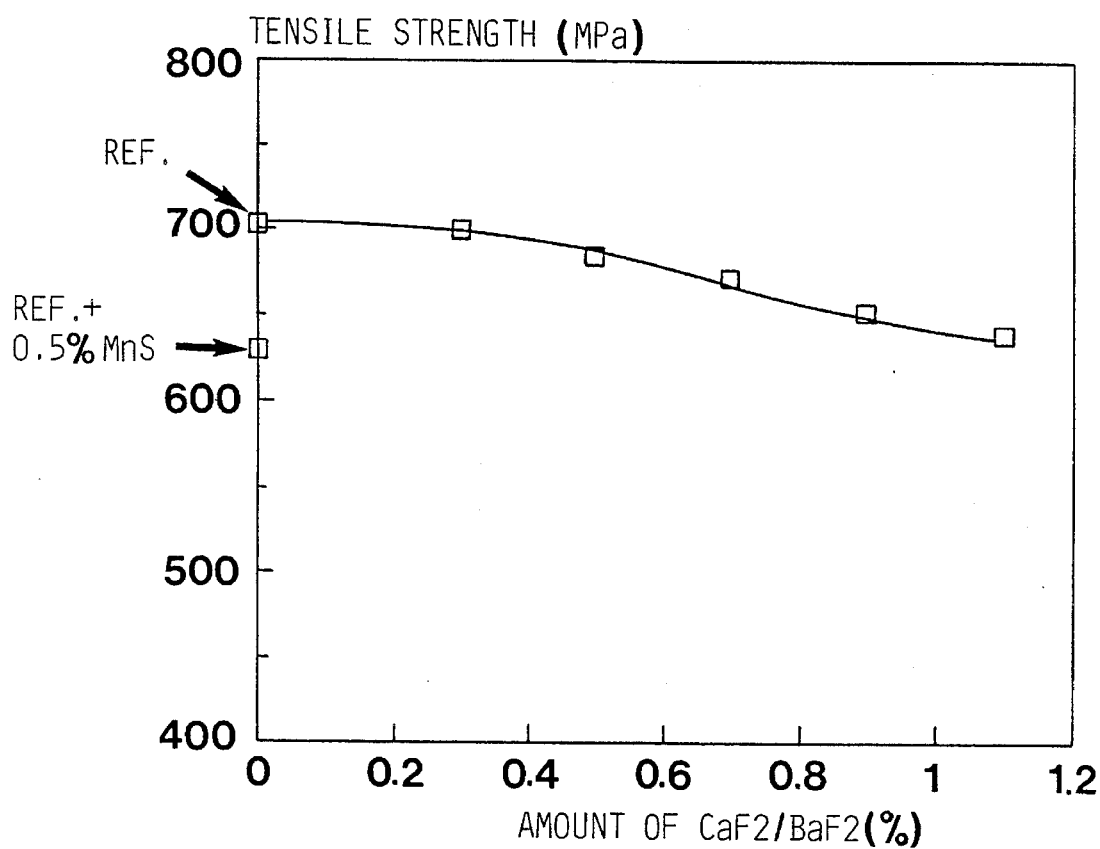
FIG. 4b. TENSILE STRENGTH OF Fe-4%Ni-1.5%Cu-0.5%Mo-0.5%C AS A FUNCTION OF THE ADDED AMOUNT OF CaF2/BaF2 IN WEIGHT RATIO 38/62 WITH ADDITION OF 0.2%MnS
COMPACTING: 600MPa
SINTERING: 1120C; 30 MIN; ENDOGAS+C-POT=0.5%

PARTICULATE CAF$_2$ AND BAF$_2$ AGENT FOR IMPROVING THE MACHINABILITY OF SINTERED IRON-BASED POWDER

FIELD OF THE INVENTION

The present invention relates to a machinability-improving powder added to an iron-based powder composition for use in powder-metallurgical manufacture of components.

BACKGROUND OF THE INVENTION

Powder-metallurgical manufacture of components often involves the following process steps. A base powder, generally an iron or steel powder, is admixed with alloying elements, such as nickel, copper, molybdenum and carbon, in the form of a powder, and a lubricant. The powder mixture is thereafter compacted in a press tool yielding what is known as a green body of almost final geometry. After compacting, the compact is sintered so as to obtain its final strength, hardness, elongation etc.

One of the major advantages of powder-metallurgical manufacture of components is that it becomes possible, by compacting and sintering, to produce blanks of final or very close to final shape. There are however instances where subsequent machining is required. For example, this may be necessary because of high tolerance demands or because the final component has such a shape that it cannot be pressed directly but requires machining after sintering. More specifically, geometries such as holes transverse to the compacting direction, undercuts and threads, call for subsequent machining.

By continuously developing new sintered steels of higher strength and thus also higher hardness, machining has become one of the major problems in powder-metallurgical manufacture of components. It is often a limiting factor when assessing whether powder-metallurgical manufacture is the most cost-effective method for manufacturing a component. Hence, there is a great need for new and more effective additives to improve the machinability of sintered steels. It then is important that this additive does not appreciably affect the mechanical properties, such as tensile strength and elongation, of the sintered material.

Today, there are a number of known substances which are added to iron-based powder mixtures to facilitate the machining of components after sintering.

The commonest powder additive is MnS, which is mentioned e.g. in EP 0 183 666, describing how the machinability of a sintered steel is improved by the admixture of such powder. Materials which are difficult to machine, in this context materials having a hardness above about 180 HV, cannot however be machined properly by adding MnS. Moreover, the addition of MnS often entails an unacceptable reduction of the strength of the material after sintering.

U.S. Pat. No. 4,927,461 describes the addition of hexagonal BN (boron nitride) to iron-based powder mixtures to improve machinability after sintering. By agglomerating very fine BN powder (0.05–1.0 µm), it is possible to achieve a similar improvement of the machinability of iron-based powder mixtures after sintering as by the addition of MnS. However, the sintered strength is affected to a lesser extent if a correct amount of BN powder is added, than when adding MnS. As in the case of MnS, BN additions do however not make it possible in industrial production to machine materials having a hardness above 200 HV.

WO 91/14526 describes how small amounts of Te and/or Se together with MnS are used to improve the machinability about twice in powder-metallurgical materials that are difficult to machine. The addition of Te and/or Se is already conflicting with environmetal considerations, in that the hygienic limit values for these additives are very low and there is a tendency towards ever more stringent environmental regulations.

SUMMARY OF THE INVENTION

One object of the present invention is to provide a powder to be added to an iron- or steel-based powder composition which after sintering gives improved machinability in the resulting components. In particular, the invention provides an agent improving the machinability of materials which are difficult to machine, in this context materials having a hardness above about 180 HV and a strength above about 700 MPa, and being essentially free from hard phase material.

Another object of the invention is to provide a machinability-improving agent which but to a small extent, or not at all, affects the mechanical properties of the sintered component and which is essentially harmless.

BRIEF DESCRIPTION OF THE DRAWINGS

FIG. 1a is a graph of machinability of Fe-4% Ni-1.5% Cu-0.5% Mo-0.5% C with addition of fluorine compounds;

FIG. 1b is a graph of tensile strength of Fe-4 % Ni-1.5 % Cu-0.5 % Mo-0.5 % C with addition of fluorine compounds;

FIG. 2a is a graph of machinability of Fe-4 % Ni-1.5 % Cu-0.5 % Mo-0.5 % C with addition of 0.6% CaF$_2$/BaF$_2$ in varying ratios or with 0.2% MnS;

FIG. 2b is a graph of tensile strength of Fe-4% Ni-1.5% Cu-0.5% Mo-0.5% C with addition of 0.6% CaF$_2$/BaF$_2$ in varying ratios or with 0.2% MnS;

FIG. 3a is a graph of machinability of Fe-4% Ni-1.5% Cu-0.5% Mo-0.5% C as a function of the added mount of CaF$_2$/BaF$_2$ in a weight ratio 38/62;

FIG. 3b is a graph of tensile strength of Fe-4% Ni-1.5% Cu-0.5% Mo-0.5% C as a function of the added mount of CaF$_2$/BaF$_2$ in a weight ratio 38/62;

FIG. 4a is a graph of machinability of Fe-4 % Ni-1.5 % Cu-0.5 % Mo-0.5 % C as a function of the added mount of CaF$_2$/BaF$_2$ in a weight ratio 38/62 or with addition of 0.2% MnS; and FIG. 4b is a graph of tensile strength Of Fe-4 % Ni-1.5 % Cu-0.5 % Mo-0.5 % C as a function of the added mount of CaF$_2$/BaF$_2$ in a weight ratio 38/62 or with addition of 0.2% MnS.

DETAILED DESCRIPTION OF THE PREFERRED EMBODIMENTS

It has been found that these objects can be achieved by admixing to an iron-based powder composition an agent containing a powder of a combination of calcium fluoride and barium fluoride. Preferably, the additive according to the invention is produced by first melting calcium fluoride with barium fluoride in a weight ratio of CaF$_2$/BaF$_2$ in the range of 20/80–60/40. Most preferred is a melt having a eutectic composition, i.e. 38% by weight of CaF$_2$ and 62% by weight of BaF$_2$. After cooling, this melt is ground to a powder which is added to the iron-based powder composition. According to the invention, the ground powder particles are essentially free (i.e. not attached to graphite particles, see below) and have an average particle size below 100 μm. Preferably, the average particle size ranges between 20 μm and 70 μm. If the particle size becomes too large, the strength of the sintered component will be adversely affected and the machinability-improving effect becomes unsatisfactory. Also when the powder additive is too fine, the machinability-improving effect becomes insufficient. The fluoride particles may be of synthetic or natural origin. The purity of the fluorides also affects the machinability-improving effect, and it has been found that the content of impurities in the starting material used, e.g. fluorspar, should not exceed 3% by weight, preferably not 2% by weight. According to the invention, the machinability-improving fluoride-containing powder is added to an iron or steel powder in an amount of about 0.1 to 1.0% by weight, preferably 0.3–0.9% by weight of the powder composition. For contents below 0.1% by weight of $BaF_2/CaF_2$, the machinability-improving effect becomes insufficient while for contents above 1.0% by weight, the influence of $BaF_2/CaF_2$ adversely affects strength and dimensional change.

One field of use of systems with fluorine compounds based on $CaF_2$ involves solid lubricants for reducing the friction between surfaces which are loaded at room temperature and at elevated temperatures. This is reported in "Some Improvements in Solid Lubricants Coatings for High Temperature Operations", ASLE Transaction, Vol. 16/1, pp. 42–49. The use of calcium fluoride and/or barium fluoride as a lubricant in powder-metallurgical materials with the primary aim of improving wear-resistance in sintered products, such as valve seats containing hard phase material, is also disclosed e.g. in U.S. Pat. Nos. 4,274,876, 4,836,848, JP-A-53-123314, SU 885-319, SU 1114-70, SU 1481-262, JP 63-42348 and EP 277 239.

SU 1585-069 teaches that additions of $CaF_2$ and S can be used for improving the machinability of powder-metallurgical materials, but the addition of $CaF_2$ is then very high (2–3%). Otherwise, S is well known for improving the machinability of both conventional and powder-metallurgical materials. This publication cannot thus be considered to be of any major guidance to anyone skilled in the art who intends to improve the machinability of powder-metallurgical materials, since S would then first have to be eliminated before essentially reducing the added amount of $CaF_2$. Even if the additive according to the present invention can be combined with other conventional machinability-improving additives, such as MnS, it preferably is essentially free from elementary sulphur which, in addition to being environmentally undesirable, has a marked effect on the dimensional change.

JP 63-137137 discloses the addition of $CaF_2$ or $BaF_2$ to iron-based powder mixtures with a view to improving the machinability of the components obtained after sintering, i.e. the object is the same as in the present invention. According to this Japanese patent application, however, the fluoride is not in free form when added to the iron or steel composition, but it must be completely or partly attached to graphite. The purpose of using fluoride attached to graphite is to prevent the graphite from completely dissolving in the iron matrix. The undissolved graphite then acts by forming a lubricating film between the tool and the material during machining. Furthermore, the Japanese application stipulates that relatively coarse carbon particles be added, which adversely affects the strength of the final component. Thus, the Japanese application does not in any way indicate that free fluoride particles would give improved machinability. The advantages of the present invention over the invention according to the Japanese application is that, in the present invention, the step of fluoride absorbtion on carbon is dispensed with, since carbon need not be used at all in the invention, and if it is desirable to add carbon, finer carbon particles can be used, which entails comparatively improved strength.

In addition to the additives as such, the present invention also encompasses iron- or steel-based powder compositions containing the additives, as well as the sintered products produced from these compositions. It is preferred that these powder compositions are essentially free from hard phase material, since preliminary tests have shown that the agent according to the present invention does not exhibit any marked machinability-improving effect when hard phase material is included in the iron or steel compositions. As used herein, "hard phase material" relates to materials of non-metal having a hardness which essentially exceeds the hardness of alloyed metal, or exceeds 800 microvickers. Examples of hard phase materials are carbides, nitrides, oxides and borides.

The powder compositions according to the invention may, in addition to iron and additive, comprise other substances, such as C, P, Cr, Mn, Cu, Ni and/or Mo, which are traditionally included in this type of powder compositions. Preferably, these substances are included in the powder compositions in the following contents: 0.1–2% by weight C, 0–0.6% by weight P, 0–25% by weight Cr, 0–10% by weight Mn, 0–5% by weight Cu, 0–8% by weight Ni, and 0–2% by weight Mo, the additive mentioned above being included in an amount of 0.1–1.0% by weight, preferably 0.3–0.9% by weight.

According to a particular aspect of the invention, $CaF_2$ and $BaF_2$ are used in such known iron and steel compositions which, before the conception of the present invention, were admixed with sulphur for improved machinability. However, since sulphur causes swelling during sintering, whereas $CaF_2$ and $BaF_2$ substantially do not affect the dimensions during this step, these known compositions can be admixed with another substance which, like sulphur, causes swelling during sintering. An example of such a swelling substance is $MoS_2$, which may make up 0.05–0.5% by weight, preferably 0.1–0.3% by weight of the iron-based composition.

The powder-metallurgical manufacture of components by means of the additive according to the invention is performed in conventional manner, i.e. most often by the following process steps: The base powder, i.e. the iron or steel powder, is admixed with desired alloying elements, such as nickel, copper, molybdenum and optionally carbon as well as the additive according to the invention in powder form. This powder mixture is admixed with a conventional lubricant prior to compacting, for instance zinc stearate, which disappears during the subsequent sintering. Mixing is done to distribute the alloying elements homogeneously in the material. The powder mixture is thereafter compacted in a press tool yielding what is known as a green body of close to final geometry. Compacting generally takes place at a pressure of 400–800 MPa. Higher compacting pressures only give an insignificant increase of the density but essentially increased tool wear. Lower compacting pressures entail densities which are too low to be useful in most structural details. After compacting, the compact is sintered and is given its final strength, hardness, elongation, etc. Sintering must take place at a temperature above 1083° C. to make it possible to use Cu as alloying element. In view of the rate of diffusion in the material and the minimising of the sintering time, a maximum temperature is preferred.

However, most of the production furnaces can only cope with temperatures up to 1150° C. Today, the commonest sintering temperature is 1120° C. At this temperature, desirable properties are generally achieved after sintering for 30 min.

The present invention will be illustrated hereinafter in a few non-limitative Examples.

All the materials used in these Examples are commercially available from Höganäs AB, Sweden, except for the $CaF_2$ which is a high-purity (99% $CaF_2$) fine-grade fluorspar supplied by Indesko AB, Sweden, and the $BaF_2$ which is supplied by Kali-Chemie AG, Germany. The materials in the following Examples have all been compacted at 600 MPa to standardised tensile test bars according to ISO 2740-1973 and to discs having a diameter of 50 mm and a height of 12 mm. The materials were sintered in a laboratory mesh belt furnace at 1120° C. for 30 min in endothermic atmosphere with a carbon potential corresponding to 0.5%. The test bars were used to determine tensile strength according to EN 10002-1, hardness according to ISO 6507/1-1992 and dimensional change. The discs were used in drill tests to determine the machinability index. This index is defined as the average number of holes which six identical drills can make through six discs before the drills are worn out. Drilling was performed with high-speed steel drills at a constant speed and a constant feed without any coolant.

The test material used in all the tests was a high strength, iron-based material containing 4% Ni, 1.5% Cu, 0.5% Mo, 0.5% C and the remainder being Fe, which after compacting and sintering under the conditions specificed below had a strength of about 700 MPa and a hardness of about 200 HV.

EXAMPLE 1

To the above test material was admixed three different powder compositions containing $CaF_2/BaF_2$ powder and MnS powder. The CaF2—$BaF_2$ powder consisted of a eutectic mixture of the fluorides included, which had first been fused together at 1150° C. and thereafter ground to a powder having a particle size of substantially less than 100 μm. The three powder mixtures consisted of 0.2% by weight $CaF_2/BaF_2$+0.4% by weight MnS, 0.4% by weight $CaF_2/BaF_2$+0.4% by weight MnS, and 0.4% by weight $CaF_2/BaF_2$+0.2% by weight MnS. The references used were a material with an addition of 0.5% by weight MnS and a material without any addition. The different mixtures were compacted at a compacting pressure of 600 MPa and thereafter sintered in a belt furnace at a temperature of 1120° C. for 30 min in endothermic atmosphere with a carbon potential of 0.5%. During the compacting operation, the material was compacted both to standardised tensile test bars for powder-metallurgical materials, and to discs having a diameter of 50 mm and a height of 12 mm. The sintered discs were thereafter subjected to a drill test where the average number of holes drilled in each disc before the drill was worn out was used as a measurement of the machinability of the material. Drills of high speed steel were used and fed at a constant speed without any coolant. The tensile test bars were examined in customary manner by tensile testing. FIGS. 1a and b show the results obtained from the drill tests and the tensile tests, respectively. As appears from FIG. 1a, machinability was considerably improved in the inventive material as compared with the reference materials and the comparative material. It clearly appears from the Figure that a certain content of chemical compounds containing fluorine is necessary in the powder additive to provide a desirable machinability improvement in this material. From FIG. 1b appears how the strength changes with different machinability additives. As appears from the Figure, the strength is not as affected by machinability additives containing fluorine as by an addition containing MnS only.

EXAMPLE 2

To the above-mentioned test material was admixed a powder composition consisting of 0.6% by weight $CaF_2/BaF_2$ with different weight ratios, and 0.2% by weight MnS. The $CaF_2/BaF_2$ powders were prepared by first fusing together the fluorides included and thereafter grinding them to a powder of a given weight ratio. The $CaF_2/BaF_2$ powder had a particle size substantially below 100 μm. The reference materials used were the same materials as in Example 1. The mixtures were compacted and sintered in a similar way as in Example 1 and thereafter tested. FIGS. 2a and b show the results measured during testing. As appears from FIG. 2a, machinability was considerably improved with the inventive materials as compared with the reference materials. FIG. 2b shows that the strength is not affected to any considerable extent by additions according to the invention.

EXAMPLE 3

To the above-mentioned test material was admixed a powder consisting of varying additives in the range 0.3–0.9% by weight $CaF_2/BaF_2$ (based on the weight of the total powder composition) and having a eutectic composition. Before being admixed to the iron-based powder composition, the $CaF_2/BaF_2$ powder had first been fused together and thereafter ground to a powder. The reference materials used were the same materials as in Example 1. The mixtures were compacted and sintered in a similar way as in Example 1. FIGS. 3a and b show the results measured during testing. As appears from FIG. 3a, machinability was considerably improved with the inventive materials as compared with the reference materials. FIG. 3b shows that the strength is affected only marginally when adding the inventive powder to the iron-based powder mixture.

EXAMPLE 4

To the above test material were admixed a powder composition which consisted of varying additions in the range 0.3–1.1% by weight of $CaF_2/BaF_2$ of a eutectic composition, and which had first been fused together and thereafter ground to a powder, as well as 0.2% by weight MnS based on the total powder composition. The reference materials used were the same materials as in Example 1. The mixtures were compacted and sintered in a similar way as in Example 1. FIGS. 4a and b show the results measured during the subsequent testing. As appears from FIG. 4a, machinability was considerably improved with the inventive material as compared with the additive previously known. The addition of MnS gives a most unexpected synergistic effect together with $CaF_2/BaF_2$ and further improves machinability as compared with the mixtures previously used. FIG. 4b shows that the strength is but insignificantly affected when the powder according to the invention is added to the iron-based powder composition. It is especially surprising that the addition of MnS yields such a positive effect in combination with other additions in iron-based mixtures, since MnS has in itself an adverse effect on strength.

I claim:

1. An iron-based powder composition which is essentially free from hard phase material for compacting and sintering to products having improved machinability, containing 0.1–1.2% by weight C, 0–0.6% by weight P, 0–25% by weight Cr, 0–10% by weight Mn, 0–5% by weight Cu, 0–8% by weight Ni, and 0–2% by weight Mo, characterised in that it contains 0.1–1.0% by weight of a eutectic composite of a powder of calcium fluoride and barium fluoride as machinability-improving additive.

2. A composition as claimed in claim 1, characterised in that it contains 0.05–0.5% by weight of $MoS_2$.

3. A composition as claimed in claim 1, characterised in that the machinability-improving additive further contains MnS in an amount of at most 30% by weight of the total amount of calcium fluoride and barium fluoride.

4. A composition as claimed in claim 3, characterised in that it contains 0.05–0.5% by weight of $MoS_2$.

5. A composition as claimed in claim 3, characterised in that it contains 0.1–0.3% by weight of $MoS_2$.

6. A sintered product essentially free from hard phase material having improved machinability, containing 0.1–1.2% by weight C, 0–0.6% by weight P, 0–25% by weight Cr, 0–10% by weight Mn, 0–5% by weight Cu, 0–8% by weight Ni, and 0–2% by weight Mo, as well as 0.1–1.0% by weight of a powder of a eutectic composition of calcium fluoride and barium fluoride, optionally together with MnS as machinability-improving additive.

* * * * *